United States Patent Office 2,883,425
Patented Apr. 21, 1959

2,883,425

METHOD FOR PREPARING BICYCLOOCTENONES

Thomas J. Kealy, Wilmington, Del., assignor to E. I. du Pont de Nemours and Company, Wilmington, Del., a corporation of Delaware No Drawing. Application January 31, 1957
Serial No. 637,379

4 Claims. (Cl. 260—586)

This invention relates to a new method for preparing cyclic ketones and to novel ketones thus obtained.

Ketones constitute an important class of chemicals. There are many known methods for preparing ketones, many of which are only of laboratory interest. Among the oldest methods is the vapor phase decarboxylation of carboxylic acids over metal oxide and metal carbonate catalysts. Another method, applicable to the synthesis of aliphatic ketones, is heating metal salts of aliphatic acids. Still another method is dehydrogenation of alcohols. Yet another method is acylation of hydrocarbons. All of these methods have shortcomings which limit their utility in one way or another. It has therefore been a standing research objective to find simple, more generally applicable, and cheaper routes to ketones.

It is an object of this invention to provide a new method for preparing bicyclic ketones. It is a further object to prepare such ketones having utility as heat exchange and pressure fluids. Still a further object is to prepare certain new bicyclic ketones containing at least one ethyl group adjacent to the carbonyl group which have been hitherto unavailable by any other method. These and other objects will become apparent from the following disclosure.

According to this invention bicyclo[2.2.2]oct-5-en-2-ones are obtained by heating, as sole reactants, ethylene and a monohydric phenol or resorcinol at 200–400° C. and a pressure of at least 1000 atmospheres. Thus an obvious advantage of the process of the invention resides in the use of abundantly available low cost ethylene as one of the initial reactants.

More specifically, a preparation of the bicyclic ketones is as follows: A pressure reactor of about 200 ml. capacity is charged with the phenol. The reactor is then placed in a rocker mechanism, equipped with heating means, and ethylene is injected so that at a temperature of 200–400° C. the total pressure is at least 1000 atmospheres. Throughout the reaction period, ethylene is added as required to maintain the pressure at the level selected for operation. Thereafter, the reaction mixture is permitted to cool to room temperature, excess ethylene is vented and the contents discharged. The desired products are isolated by fractionation, extraction, or other methods known to those skilled in the art.

The relative proportions of the two reactants are not critical but it is preferred to use at least one mole of ethylene per mole of phenol and desirably a slight to moderate excess of ethylene, e.g., a 3:1 to 20:1 ratio.

As the phenol reactant, there may be used any monohydric phenol, such as phenol, cresol, xylenol, etc., alkyl-substituted phenols, e.g., ortho-ethylphenol, 2,6-dimethylphenol, 2,6 - diethylphenol, 2,4 - dipropylphenol, etc., monoethers of catechol, resorcinol and hydroquinone, i.e., hydrocarbyl oxyphenols, e.g., methyl hydroxyphenyl ethers, ethyl hydroxyphenyl ethers, hydroxyphenyl tolyl ethers, hydroxyphenyl cyclohexyl ethers, hydroxyphenyl methylcyclohexyl ethers, etc., hologenated phenols, e.g., p-chloro-, p-iodo, and p-bromophenols, and the dihydric phenol, resorcinol.

The ethylene used can be petroleum derived or made by dehydration of ethanol. It should, however, be of good quality and be essentially free of oxygen, carbon monoxide, and acetylene. The presence of trace amounts of saturated hydrocarbons in the ethylene does not seem to affect the reaction adversely, and such materials may therefore be present as diluents in the ethylene.

The reaction medium is not essential but if desired one may be used. Useful reaction media are benzene, toluene, cyclohexane, tetra- and decahydronaphthalenes, etc. The amount of reaction medium to be used is not critical. It can equal the weight of the phenol or it can exceed it by ten or more fold.

The process is generally operated at 200–400° C., and the amount of ethylene added is adjusted so that within this temperature range the pressure within the reactor is at least 1000 atmospheres and preferably between 2500 and 3500 atmospheres. No compensating advantages accrue from using pressures above 5000 atmospheres, and this represents a practical upper limit of pressure.

The bicyclo[2.2.2]oct-5-en-2-ones of the invention are characterized by having the extracyclic valences of the 3 carbon atom vicinal to the carbonyl group satisfied by ethyl groups or by an ethyl and methyl group. Preferred groups of such bicyclooctenones are those in which the 1 carbon is either unsubstituted or carries a hydroxyl, methyl, or ethyl group and the 5 and 6 carbon atoms are unsubstituted or carry methyl or ethyl groups.

The examples which follow illustrate but do not limit the invention.

EXAMPLE 1

*3,3-diethyl- and 1,3,3-triethyl-bicyclo[2.2.2]oct-5-en-2-one*

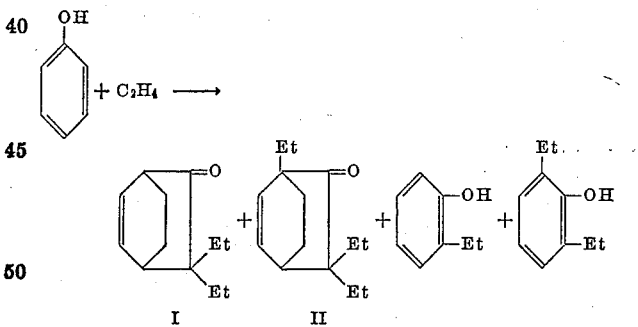

A 200-ml. pressure reactor was charged with 40 g. of phenol, and the oxygen in the system was removed by evacuating and purging with oxygen-free nitrogen several times. The charged reactor was then heated to 275° C., while ethylene was injected so that at 275° C. the total pressure was between 2700 and 3000 atmospheres. These conditions were maintained for 14–16 hours with agitation. Ethylene was periodically added, as required to maintain the pressure at the 2700–3000 atmosphere level. The products from three such runs were combined to give 251 g. of almost colorless, opaque liquid which was triturated with pentane. The pentane suspension was filtered free of grease, and the filtrate was extracted with four 200-ml. portions of Claisen's alkali and washed once with water. The Claisen's alkali is prepared by dissolving 350 g. of potassium hydroxide in 250 ml. of water, cooling, and diluting to 1 liter with methanol [Org. Synthesis, collective vol. III, p. 260, John Wiley & Sons, Inc., New York (1955)]. After drying the pentane solution over anhydrous calcium sulfate, the solvent was removed, and the product was distilled to obtain a 124 g. (48%) cut, boiling at 65–78° C./0.3 mm. and having an $n_D^{25}$ of 1.4885.

The above product was fractionated in a 13 mm. diameter fractionating column to give 10 ml. of 3,3-diethyl-bicyclo[2.2.2]oct-5-en-2-one (I), B.P. 130.5° C./20 mm.; $n_D^{25}$ 1.4935, $d_{25}$ 0.9968 and 85 ml. of 1,3,3-triethyl-bicyclo[2.2.2]oct-5-en-2-one (II), B.P 144.5° C./20 mm., $n_D^{25}$ 1.4878–1.4882, $d_{25}$ 0.9825. These ketones have a camphoraceous odor and analyze as follows:

*Analysis.*—Calc'd. for $C_{12}H_{18}O$: C, 80.85; H, 10.18. Found: C, 80.65, 81.47; H, 10.18, 10.37.

*Analysis.*—Calc'd. for $C_{14}H_{22}O$: C, 81.50; H, 10.75. Found: C, 81.63; H, 10.80.

The 1,3,3-triethyl-bicyclo[2.2.2]oct-5-en-2-one boils at 270° C./1 atm. and is stable when refluxed in air. This thermal stability makes this product useful as a heat-exchange and pressure fluid.

Treatment of the crude phenol-ethylene product with 2,4-dinitrophenylhydrazine reagent in 95% alcohol containing a little sulfuric acid gave a crystalline derivative, M.P. 148–162° C. After two recrystallizations from ethanol, the melting point was 165.5–168° C. (170–170.5° C. pure). This product, the 2,4-dinitrophenylhydrazone of 3,3-diethyl-bicyclo[2.2.2]oct-5-en-2-one, analyzed as follows:

*Analysis.*—Calc'd. for $C_{18}H_{22}N_4O_4$: C, 60.32; H, 6.19; N, 15.63. Found: C, 59.90; H, 6.12; N, 15.86.

The infrared, ultraviolet, and nuclear magnetic resonance spectra of the pure ketones are consistent with structures I and II. Carbonyl absorption occurs in the infrared at 5.8 microns (diethyl ketone), 5.85 microns (triethyl ketone), and in the ultraviolet region at 3000 A. ($\epsilon = 0.0981 \times 10^3$, diethyl ketone), at 3020 A. ($\epsilon = 0.103 \times 10^3$, triethyl ketone). Other significant infrared bands include 3.3 microns =OH, 3.4 microns sat. CH, 6.2 microns strained $>C=C<$ and 7.25 microns $CH_3$.

A 2,4-dinitrophenylhydrazone could not be obtained from the triethyl ketone (II) which indicated that the ethyl groups are close to the carbonyl function.

Neither ketone (I nor II) reacted with ethyl nitrite, a reagent known to react with the

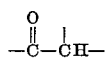

group. Thus, the presence of a gem diethyl group alpha to the carbonyl group was established in both ketones. Hydrogenation confirmed the presence of only one double bond in each ketone. Finally, pyrolysis of the diethyl and triethyl ketones to o-ethylphenol and 2,6-diethylphenol, respectively, further confirmed the assignment of structures I and II to these products.

The Claisens alkali extracts from several experiments carried out as in Example 1 were diluted with water, cooled, acidified with concentrated hydrochloric acid, and extracted with pentane. The pentane extract was dried over anhydrous calcium sulfate and the pentane was removed by distillation to obtain 65 ml. of liquid phenols. Distillation yielded a 10-ml. cut, B.P. 83–100° C./15 mm., $n_D^{25}$ 1.5335–1.5249, containing phenol, o-ethylphenol and 2,6-diethylphenol, and a 37-ml. fraction which was identified as 2,6-diethylphenol, B.P. 102° C./15 mm., M.P. 34.5–37°C.

A solution of 20 g. of 1,3,3-triethyl-bicyclo[2.2.2]oct-5-en-2-one, prepared as previously described, in 80 ml. of absolute ethanol was hydrogenated at room temperature using a 10% palladium-on-carbon catalyst at about 40 lb./sq. in. hydrogen pressure. One mole equivalent of hydrogen was absorbed in about 15 minutes. The pressure then remained constant while shaking was continued for about three hours. The alcohol was removed under reduced pressure, and the product was distilled, B.P. 73° C./0.2 mm., $n_D^{25}$ 1.4839. The product, 1,3,3-triethyl-bicyclo[2.2.2]octanone-2, analyzed as follows:

*Analysis.*—Calc'd. for $C_{14}H_{24}O$: C, 80.71; H, 11.61. Found: C, 81.18; H, 11.81.

A solution of 2 g. of crude 3,3-diethyl-bicyclo[2.2.2]-oct-5-en-2-one, $n_D^{25}$ 1.4900, prepared as previously described, in 75 ml. of absolute ethanol was hydrogenated using a platinum catalyst at room temperature under 40 lb./sq. in. of hydrogen. The pressure quickly dropped to the calculated amount for the absorption of one mole equivalent of hydrogen. No further uptake of hydrogen was observed during 60 hours shaking at approximately 60° C. The alcohol was removed, and a 0.5-g. portion of the product was treated with 2,4-dinitrophenylhydrazine for 20 hours. Thereafter the solution was filtered to obtain 0.24 g. of the dinitrophenylhydrazone of 3,3-diethyl-bicyclo[2.2.2]octanone-2, M.P. 178–183° C. After three recrystallizations from absolute ethanol, the product melted at 190–190.5° C. This hydrazone analyzed as follows:

*Analysis.*—Calc'd. for $C_{18}H_{24}O_4N_4$: C, 59.98; H, 6.71; N, 15.55. Found: C, 59.55; H, 6.85; N, 14.98.

The process of Example 1 was repeated, using o-ethylphenol in place of phenol. From 23 g. of o-ethylphenol and ethylene at 275° C. and 2700–3000 atmospheres pressure, there was obtained 12.5 g. (33%) of a bicyclic ketone mixture, B.P. 122–141° C./17 mm., $n_D^{25}$ 1.4882 containing 3,3-diethyl- and 1,3,3-triethyl-bicyclo[2.2.2]-oct-5-en-2-one.

Example 1 was again repeated, using salicylic acid in place of phenol. From 40 g. of salicylic acid with ethylene at 275° C. and 2750–3000 atmospheres pressure, there was obtained 15 g. (25%) of ketone products, B.P. 65–79° C./0.3 mm., $n_D^{25}$ 1.4890 containing 3,3-diethyl- and 1,3,3-triethylbicyclo[2.2.2]oct-5-en-2-one.

EXAMPLE 2

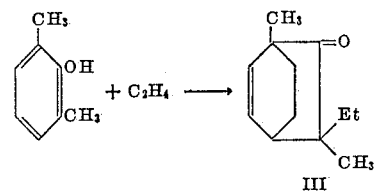

Following the procedure of Example 1, 40 g. of 2,6-dimethylphenol was reacted with ethylene at 275° C. and 2750–3000 atmospheres pressure for 14 hours. After removal of grease and phenolic material, the product was distilled to obtain 30 g. (50%) of water-white material (B.P. 42–43° C./0.2 mm., $n_D^{25}$ 1.4829, $d_{25}$ 0.9729), having a strong camphoraceous odor. The infrared and ultraviolet spectra ($\epsilon_{2980\,A.} = 0.101 \times 10^3$) were consistent with the structure of 1,3-dimethyl-3-ethyl-bicyclo[2.2.2]oct-5-en-2-one. This product analyzed as follows:

*Analysis.*—Calc'd. for $C_{12}H_{18}O$: C, 80.85; H, 10.18. Found: C, 80.79, 80.68; H, 10.36, 10.31.

EXAMPLE 3

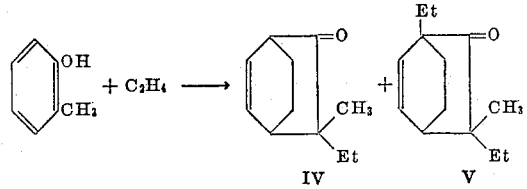

or

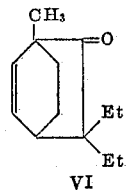

Following the procedure of Example 1, 40 g. of o-cresol was reacted with ethylene at 275° C. at 2600–3000 atmospheres pressure for 13.5 hours. From two such runs, there was obtained 57 g. (approximately 40%) of ketone product boiling at 57–71° C./0.4 mm. This product was distilled in a 36-inch fractionating column, and 45 ml. of a fraction boiling at 75° C./1 mm., was collected. This material analyzed as follows:

*Analysis.*—Calc'd. for $C_{13}H_{20}O$: C, 81.20; H, 10.48. Found: C, 81.37, 81.62; H, 10.69, 10.48.

The infrared and ultraviolet spectra $$(\epsilon_{2990\,A.} = 0.099 \times 10^3)$$

of the material were consistent with proposed structures V and VI.

Treatment of the remainder of the distilled product (13 ml., B.P. 52–74° C./1 mm.) with 2,4-dinitrophenylhydrazine and recrystallization of the derivative from absolute ethanol afforded the microcrystalline dinitrophenylhydrazone of 3-methyl-3-ethyl-bicyclo[2.2.2]oct-5-en-2-one, M.P. 146–148° C. After several recrystallizations a melting point of 154.5–155.5° C. was obtained.

*Analysis.*—Calc'd. for $C_{17}H_{20}O_4N_4$: C, 59.29; H, 5.85; N, 16.27. Found: C, 58.98; H, 5.98; N, 16.44.

EXAMPLE 4

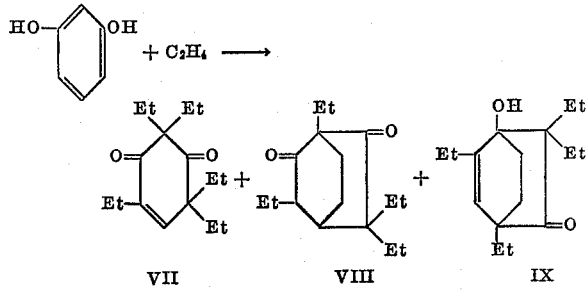

Following the procedure of Example 1, 50 g. of resorcinol was reacted with ethylene at 250° C. and 2700–3000 atmospheres pressure for 14.5 hours. The product from two similar runs, after removal of grease and phenolic material, was distilled to obtain 138 g. (55%) of light yellow liquid, B.P. 76–100° C./0.1 mm., $n_D^{25}$ 1.4871. This was combined with a previous product (B.P. 71–102° C./0.1 mm., $n_D^{25}$ 1.4871–1.4933) to make a total of 180 g., which was distilled in a 30-inch fractionating still. After 10 ml. of distillate was collected (B.P. 74–97° C./0.5 mm.), 80 ml. (44%) of the cyclohexendione was obtained (B.P. 97–98° C./0.5 mm., $n_D^{25}$ 1.4849).

*Analysis.*—Calc'd. for $C_{16}H_{26}O_2$: C, 76.75; H, 10.47. Found: C, 76.80; H, 10.34.

Distillation did not effect the separation of the remaining two components (VIII and IX); however, the last material collected (40 ml., B.P. 106–111° C./0.5 mm., $n_D^{25}$ 1.4928–1.4935) was free of the cyclohexendione, as shown by the absence of a 6.0 microns carbonyl band in the infrared.

*Analysis.*—Calc'd. for $C_{16}H_{26}O_2$: C, 76.75; H, 10.47. Found: C, 76.70; H, 10.49.

In another experiment, a total boiling range of 85–125° C./0.5 mm., $n_D^{25}$ 1.4831–1.4952, was observed during fractionation of a resorcinol/ethylene product obtained in the same manner. A constant boiling fraction (B.P. 120° C./0.5 mm., $n_D^{25}$ 1.4931) containing ketones VIII and IX was obtained.

The ketones failed to yield a derivative with 2,4-dinitrophenylhydrazine, thus indicating the presence of hindered carbonyl groups. The conjugated and unconjugated carbonyl groups of the cyclohexendione were evidenced by its infrared (5.85, 6.0 microns) and ultraviolet spectra ($\epsilon_{2310\,A.} = 8.4 \times 10^3$). Since the compound contained a conjugated carbonyl group, the possibility of a bicyclic system was eliminated, and it then was necessary to determine the position of the five ethyl groups. On the basis of the results with phenol, it was deemed unlikely that an ethyl group would reside in the position beta to the carbonyl groups. Thus, the five ethyl groups were distributed on the remaining three possible positions to give proposed structure VII.

The presence of two compounds in the higher boiling fraction was evidenced by the appearance of a hydroxyl band (2.8 microns) of moderate intensity and two unconjugated carbonyl bands (5.8, 5.85 microns) in the infrared spectrum of the material. Since the spectrum gave no evidence of aromatic material, it was concluded that the —OH was of the alcohol type. The data indicated therefore that the material consisted of a $C_{16}H_{26}O_2$ diketone and isomeric hydroxy ketone for which structures VIII and IX are proposed.

The bicyclic ketones produced in accordance with this invention are useful as heat exchange and pressure fluids, and the novel process provides a potentially economic route to these compounds.

I claim:

1. A method for preparing bicyclooctenones which comprises reacting ethylene and a compound of the group of monohydric phenols and resorcinol at temperatures of 200–400° C. and at a pressure of at least 1000 atmospheres.

2. The method of claim 1 wherein ethylene is reacted with a monohydric phenol.

3. The method of claim 1 wherein ethylene is reacted with resorcinol.

4. The process comprising reacting ethylene and a monohydric phenol at temperatures between 200° C. and 400° C. and at pressures between 2,500 and 3,500 atmospheres.

References Cited in the file of this patent

Pringsheim et al.: Ber. Deut. Chem., vol. 58, p. 1416 (1925).

Wildman et al.: J. Org. Chem., vol. 19, pp. 381–4 (1954).